(12) United States Patent  (10) Patent No.: US 8,190,884 B2
Alroy et al.  (45) Date of Patent: May 29, 2012

(54) NETWORK IDENTITY MANAGEMENT SYSTEM AND METHOD

(75) Inventors: Liore Alroy, Passaic, NJ (US); David Lando, West Orange, NJ (US); Eduardo Francos, Les Ulis (FR); Itamar Hassin, Millburn, NJ (US); Ariel Rabkin, Berkeley, CA (US)

(73) Assignee: Picup, LLC, Newark, NJ (US)

( * ) Notice: Subject to any disclaimer, the term of this patent is extended or adjusted under 35 U.S.C. 154(b) by 895 days.

(21) Appl. No.: 12/071,600

(22) Filed: Feb. 22, 2008

(65) Prior Publication Data

US 2008/0229096 A1  Sep. 18, 2008

Related U.S. Application Data

(60) Provisional application No. 60/903,306, filed on Feb. 26, 2007, provisional application No. 60/903,303, filed on Feb. 26, 2007, provisional application No. 61/006,544, filed on Jan. 18, 2008.

(51) Int. Cl.
*H04L 29/06* (2006.01)

(52) U.S. Cl. ............... 713/155; 726/4; 709/230

(58) Field of Classification Search ........... 713/155; 726/1–10; 709/203, 205, 230
See application file for complete search history.

(56) References Cited

U.S. PATENT DOCUMENTS

| | | | | |
|---|---|---|---|---|
| 5,991,617 A * | 11/1999 | Powell | ............... | 455/410 |
| 6,976,092 B1 * | 12/2005 | Daniell et al. | ............... | 709/246 |
| 7,016,875 B1 | 3/2006 | Steele et al. | | |
| 7,185,059 B2 * | 2/2007 | Daniell et al. | ............... | 709/206 |
| 7,263,102 B2 * | 8/2007 | Kreiner et al. | ............... | 370/401 |
| 7,379,464 B2 * | 5/2008 | Kreiner et al. | ............... | 370/401 |
| 7,673,327 B1 * | 3/2010 | Polis et al. | ............... | 726/5 |
| 2002/0049751 A1 | 4/2002 | Chen et al. | | |

(Continued)

OTHER PUBLICATIONS

International Search Report and Written Opinion mailed Jun. 25, 2008 in PCT Application No. PCT/US08/02406.

(Continued)

*Primary Examiner* — Edward Zee
*Assistant Examiner* — John B King
(74) *Attorney, Agent, or Firm* — Davidson Berquist Jackson & Gowdey LLP

(57) ABSTRACT

Users of Internet services (e.g., SKYPE messaging service, GOOGLETALK messaging service, AOL INSTANT MESSENGER messaging service, and MICROSOFT MESSENGER messaging service) that are initially identified using separate identifiers that may be associated with respective service providers (e.g., email addresses) can manage network identities using a single unified set of account information managed by a registry service. The registry authenticates the user's request(s) to bind a service provider identity to his or her personal registry user record. The registry internally associates the service provider identity to an internal unique identifier that is not exposed to subscribers. When a second user wishes to communicate with a first user, the second user provides any service provider identity that is believed to be associated with the first user to determine if the specified service provider identity appears to match the intended subscriber. If so, the second user may specify a nickname (unique to the second subscriber but not necessarily globally unique) to be associated internally within the registry with the internal unique identifier of the first subscriber as part of the second subscriber's user record. Later, even if the first subscriber has relinquished the service provider identity that was originally used to find the first subscriber, the second subscriber can still find the first subscriber by using the associate nickname without either subscriber ever knowing the internal unique identifier of the first subscriber.

6 Claims, 8 Drawing Sheets

U.S. PATENT DOCUMENTS

| | | | |
|---|---|---|---|
| 2003/0018726 A1* | 1/2003 | Low et al. | 709/206 |
| 2004/0199597 A1 | 10/2004 | Libbey et al. | |
| 2005/0027698 A1 | 2/2005 | Collet et al. | |
| 2005/0038876 A1 | 2/2005 | Chaudhuri | |
| 2005/0044423 A1 | 2/2005 | Mellmer et al. | |
| 2005/0198124 A1 | 9/2005 | McCarthy | |
| 2006/0168315 A1* | 7/2006 | Daniell et al. | 709/237 |
| 2006/0174350 A1 | 8/2006 | Roever et al. | |
| 2006/0179319 A1* | 8/2006 | Krawczyk | 713/180 |
| 2006/0265508 A1 | 11/2006 | Angel et al. | |
| 2007/0003066 A1 | 1/2007 | Schwartz et al. | |
| 2008/0104170 A1* | 5/2008 | Ananthanarayanan | 709/204 |
| 2009/0006202 A1 | 1/2009 | Alroy | |

OTHER PUBLICATIONS

International Search Report and Written Opinion mailed Jun. 30, 2008 in corresponding PCT application No. PCT/US2008/02405.

U.S. Appl. No. 12/071,598—Mar. 12, 2010 PTO Office Action.

U.S. Appl. No. 12/071,599—Oct. 7, 2010 PTO Office Action.

U.S. Appl. No. 12/071,599—Apr. 11, 2011 PTO Office Action.

* cited by examiner

NETWORK IDENTITY MANAGEMENT SYSTEM AND METHOD

CROSS-REFERENCE TO RELATED APPLICATIONS

The present application claims priority to U.S. Patent Application No. 60/903,306 entitled "Network Identity Management System and Method," filed on Feb. 26, 2007, U.S. Patent Application No. 60/903,303 entitled "System and Method for Providing Identity-Based Services," filed on Feb. 26, 2007, and U.S. Application No. 61/006,544 entitled "Network Identity Management System and Method," filed on Jan. 18, 2008. The entire contents of those applications are incorporated herein by reference.

FIELD OF INVENTION

The present invention is directed to a method and system for managing network identities using an identity registry.

DISCUSSION OF THE BACKGROUND

A number of on-line communication protocols exist that enable users to create network identities and communicate with each other. For example, on the Internet, MICROSOFT MESSENGER messaging service, AOL INSTANT MESSENGER messaging service, SKYPE messaging service, and GOOGLETALK messaging service each provide some level of communication between their users as well as some presence information. However, communication between these competing systems has often been problematic. For example, these applications each maintain their own namespaces, even though they may support identical modes of communication (voice, say, or text IM), and they generally do not interoperate.

Some attempts have been made to utilize services or protocols that interconnect the separate services such that communication can be made between services. TRILLIAN messaging service and JABBER messaging service are attempts that have been made to allow inter-service communication with limited success. Moreover, the management of user identities is still not yet truly unified.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
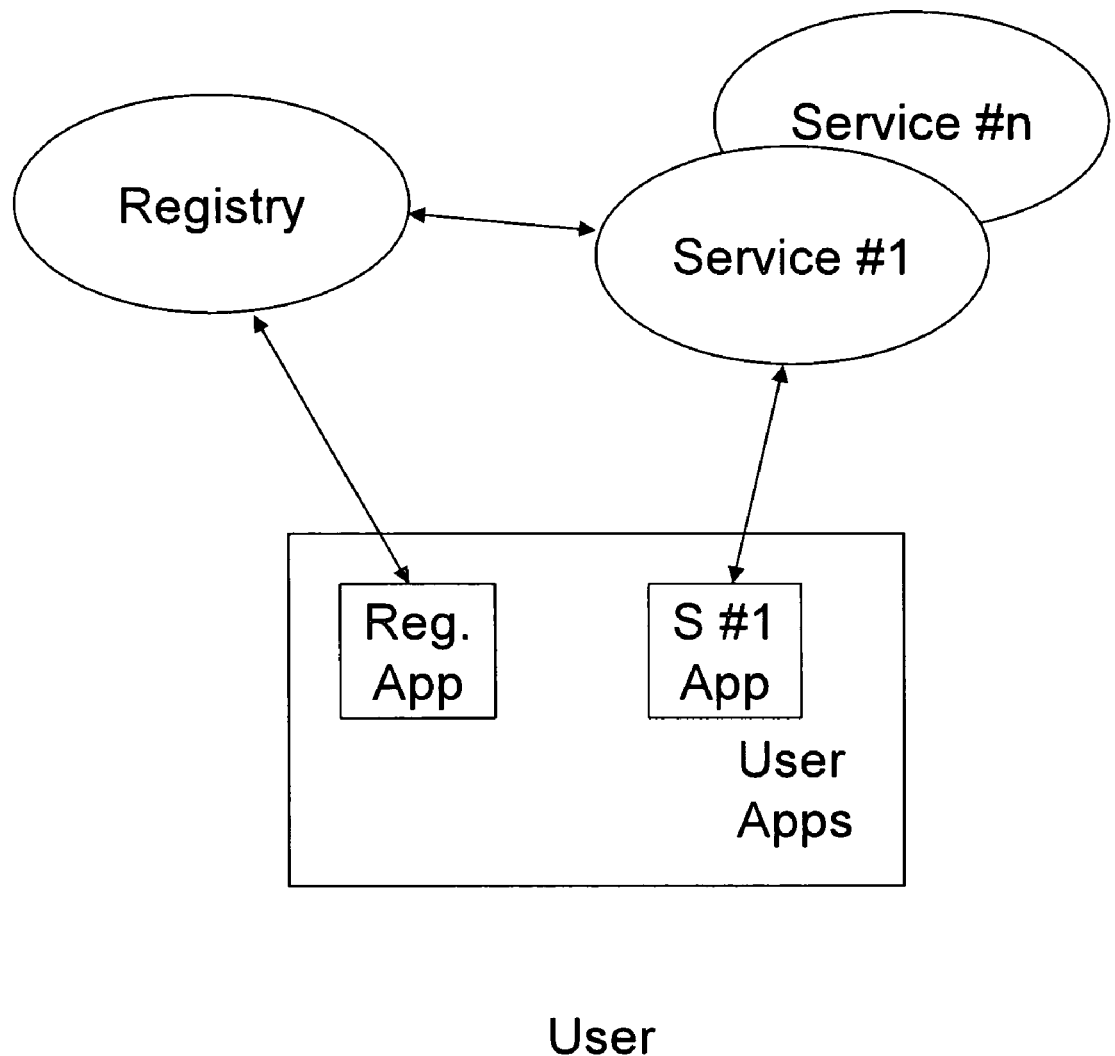
FIG. 1 is a block diagram of a network including a registry for user identities.

Turning to FIG. 1, a user of plural Internet services (e.g., SKYPE messaging service, GOOGLETALK messaging service, AOL INSTANT MESSENGER messaging service, and MICROSOFT MESSENGER messaging service) is initially identified using separate user names or other identifiers for each of the plural Internet services. For example, a fictitious user (e.g., John Jones) may have user names such as fictitioususer1@gmail.com and fictitiousdad@aol.com. Both of these user names provide methods of enabling other users to reach John Jones. However, there is no linkage between the two user names that allows John Jones to manage his account information uniformly and in one place. In addition, John Jones may not want all other users to know all of his user names or the presence information provided by the applications with which those user names are associated. To aid in account management, John Jones may subscribe to a registry service that will enable Mr. Jones to unify his on-line identities and centralize his account management and account log-on functions. One example of a registry may be the Personal Internet Communications Unification Project from NET2PHONE, Inc., referred to hereinafter as "PICUP" or "picup.com".

Figure 2:
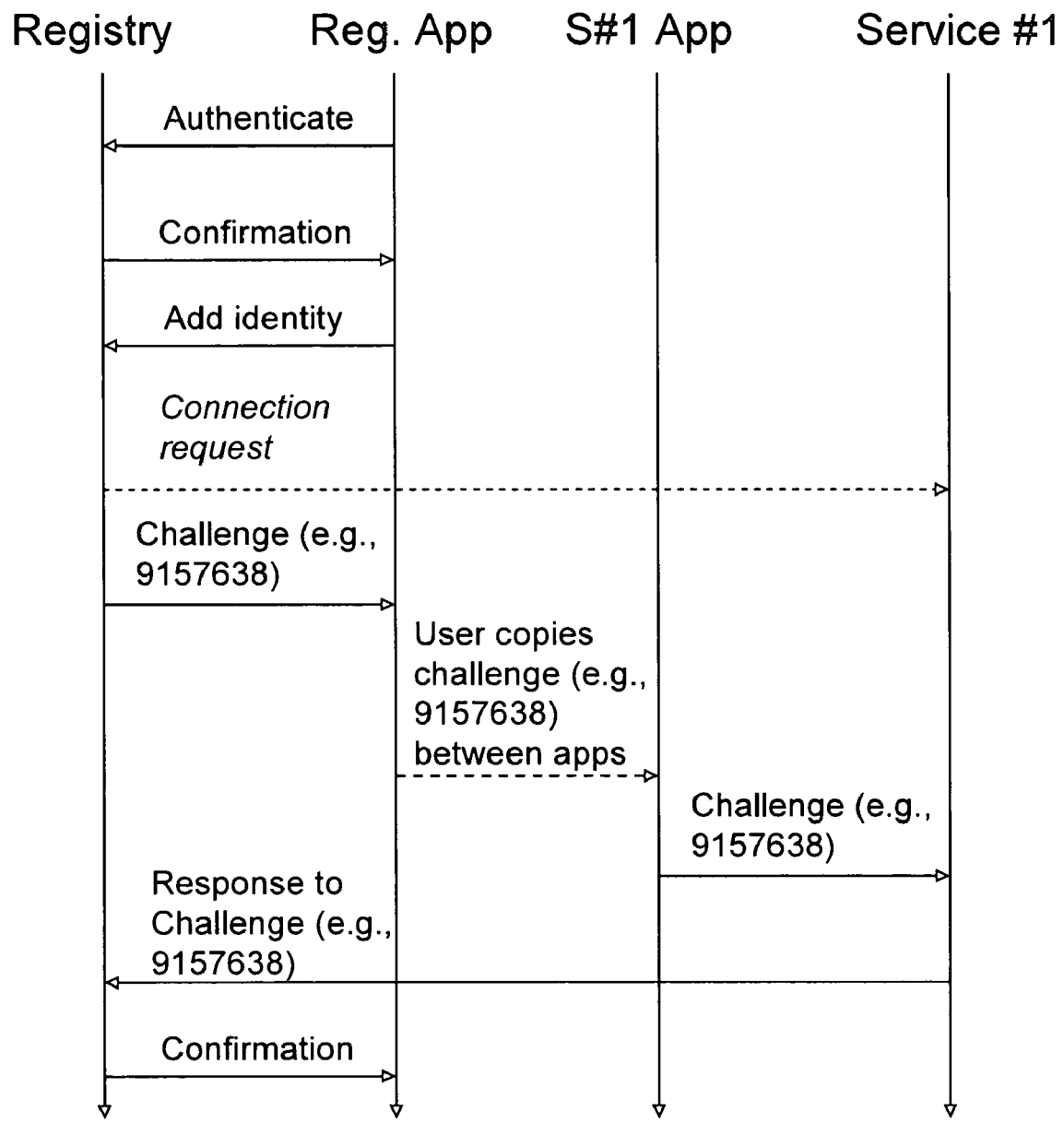
FIG. 2 is a message flow diagram showing a first identity authorizing process for use with the network of FIG. 1.

When Mr. Jones subscribes to the registry service, he is assigned or is allowed to select a registry-specific identifier, such as johnjones@picup.com. As shown in FIG. 2, Mr. Jones may authenticate himself with that name to the registry service (through any number of known authentication techniques and protocols). For example, as shown in FIG. 1, Mr. Jones may use an application (labeled "Reg. App" for registry application) to communicate with the registry service. Applications that can be used for this authentication include, but are not limited to, a web browser (e.g., MICROSOFT INTERNET EXPLORER web browser or MOZILLA FIREFOX web browser) using a user name and password combination or a custom application that passes authentication information (e.g., a user name and password combination, a fingerprint, a secure token or a signed message).

Having acquired a registry identifier from the registry and having authenticated himself to the registry, Mr. Jones can, as part of the identity management process, begin associating other identities with the registry identifier. To do this, Mr. Jones sends to the registry an "Add identity" message including an identifier such as a user name corresponding to one of the plural service providers. For example, Mr. Jones sends fictitioususer1@gmail.com to the registry.

The registry may parse the received identifier into a domain name and a user id and, if necessary (as indicated by the dashed line in FIG. 2), request a connection with the service provider associated with the domain name. For example, the registry may contact the GOOGLETALK messaging service server associated with the gmail.com domain name.

The registry then sends a "challenge" to Mr. Jones via his registry application. The challenge may be in the form of a random number, text or even graphic containing clear or obscured random text/numbers. For example, the challenge could be a random number "9157638." As depicted by the dashed line of FIG. 2, the user then transfers (e.g., copies and pastes or retypes) the random number from the registry application to a service provider application corresponding to the service provider (e.g., the GOOGLETALK messaging service server) for the identity (e.g., fictitioususer1@gmail.com) being added. The service provider application then contacts, on behalf of Mr. Jones, the service provider corresponding to the identifier (e.g., fictitioususer1@gmail.com) that he sent the registry. (Like with the registry application, the service provider application may also be implemented as either a customized application or a web browser-based application.) The service provider application then sends to the service provider the same information that was contained in the challenge that he received from the registry. Lastly, the service provider sends to the registry the challenge that the service provider received from the service provider application (as it was transferred by the user). This completes a confirmation cycle that enables the registry to verify that the user does control the account corresponding to the identifier of the service provider.

Figure 3:
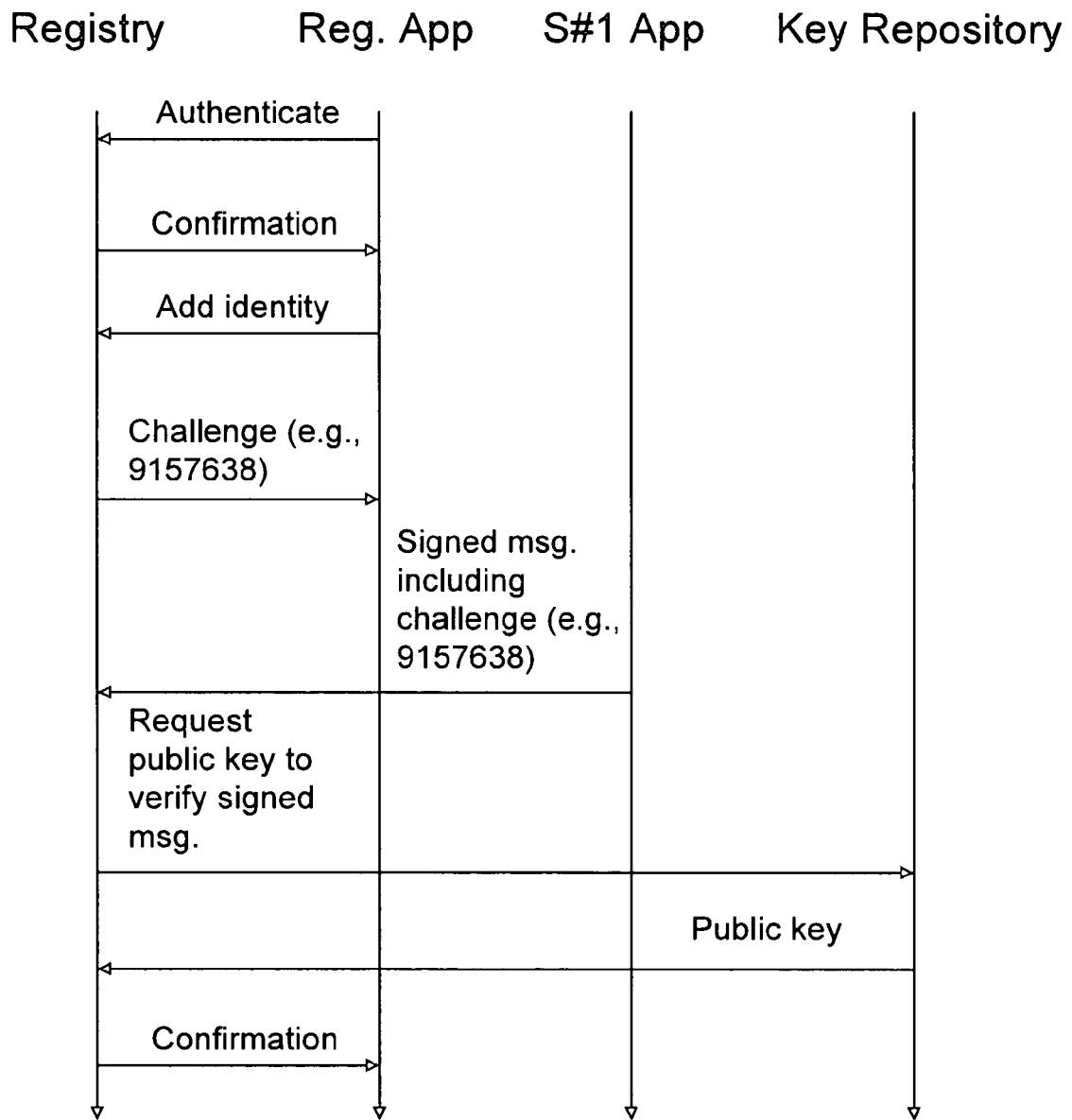
FIG. 3 is a message flow diagram showing a second identity authorizing process for use with the network of FIG. 1.

As shown in FIG. 3, a second identity adding process can be used instead. In this process, the registry is not required to make a connection with the service provider to receive the challenge. Instead, after the challenge is received by the registry application, the challenge is provided to the service provider application that signs the challenge using a private key of a public/private key pair. The service provider application then sends the signed message back to the registry, and the registry can verify the signed message using the public key received from a key repository corresponding to the service provider.

Figure 4:
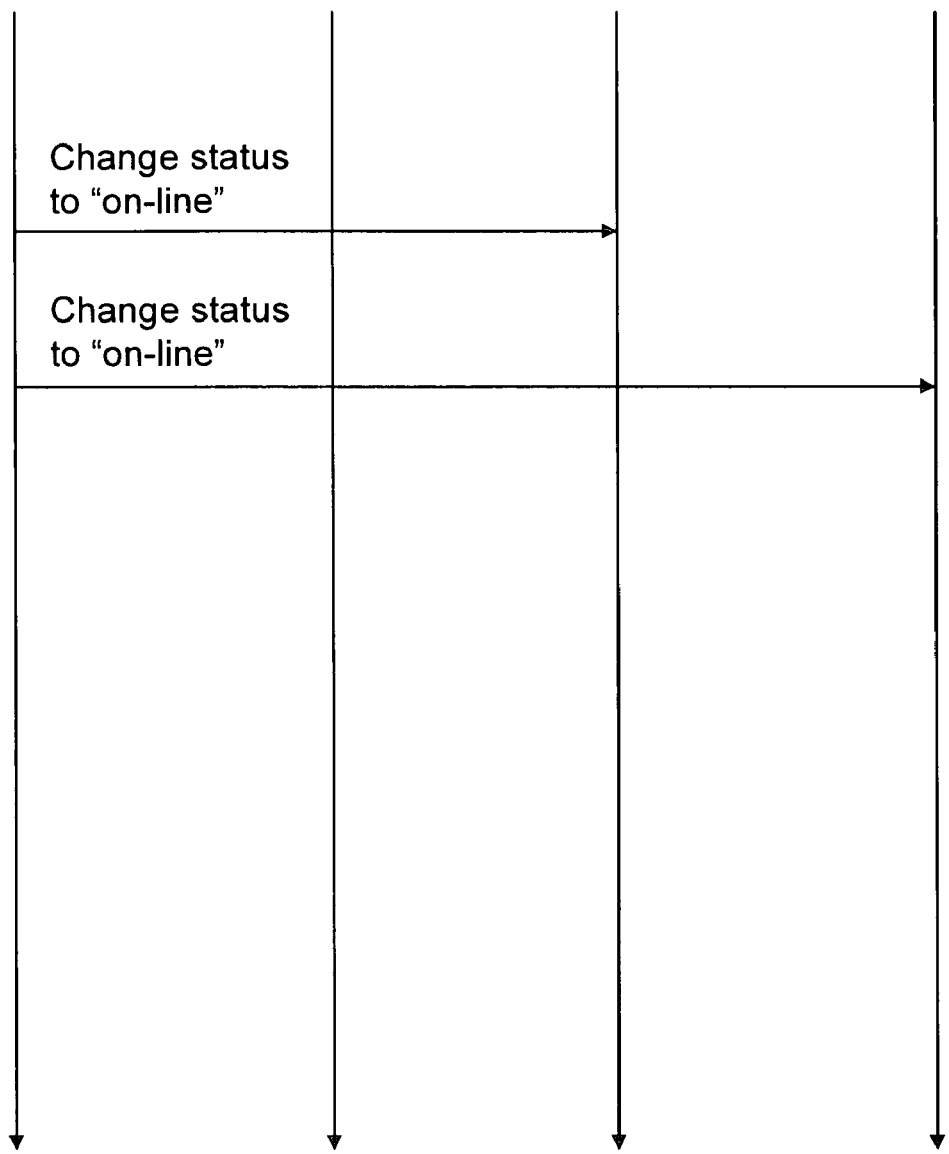
FIG. 4 is a message flow diagram showing the propagation of presence information from a registry to plural service providers.

The registry may consolidate not only identities but also real-time information (e.g., presence information) about the identities. For example, as shown in FIG. 4, Mr. Jones may set his status information to "on-line" (using either a registry application or using a service provider application). When this change is received by the registry, the registry propagates this information to all of the service providers that are managed by the registry. However, this information management assumes that the registry and the services can authenticate each other so that the service providers and the registry know that the information is to be shared.

Figure 5:
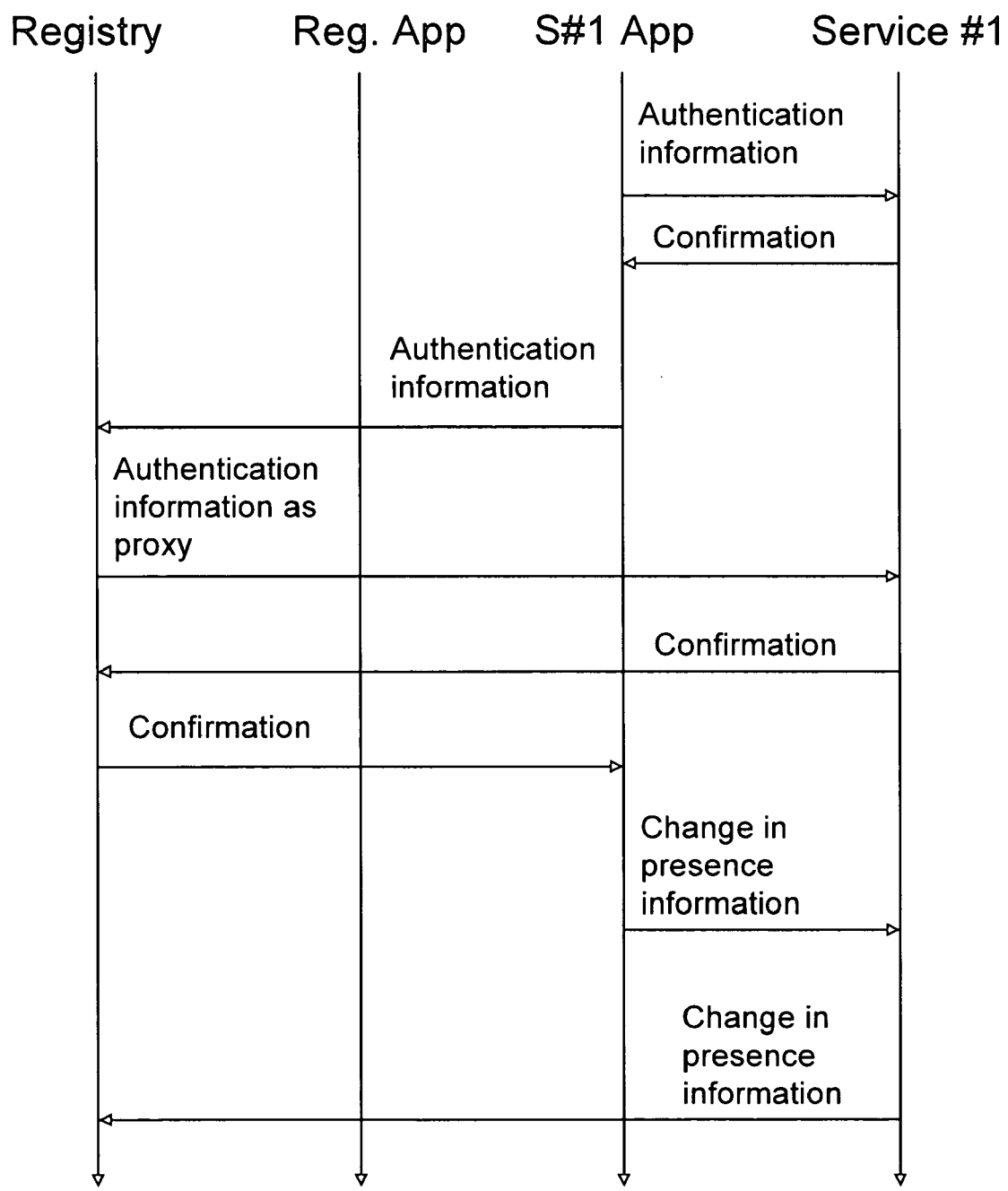
FIG. 5 is a message flow diagram showing a first process for authentication and presence information updating.

One way in which this can be achieved is to have a service provider application running locally that authenticates the user to both the service provider and to the registry. As shown in FIG. 5, a service provider application has authenticated itself to its corresponding service provider (e.g., AOL Instant Messaging service). When the user elects to use the registry to centralize its presence information, the service provider application sends to the registry the log-in information (e.g., username and password) used in the initial authentication to the service provider. The registry can then authenticate itself to the service provider as well using the authentication information that the service provider is expecting. To avoid the service provider assuming that this is a new login by the user at a different location (that may cause the existing log-in to be terminated), the registry identifies to the service provider that the registry is logging on only as a proxy that will receive presence information and not as a communications end-point.

Later, when Mr. Jones uses his service provider application to change his presence information (e.g., by setting it to "Do Not Disturb"), the information received by the service provider will be passed to the registry so that other information services may see the same change, as shown in the last two steps of FIG. 5.

Figure 6:
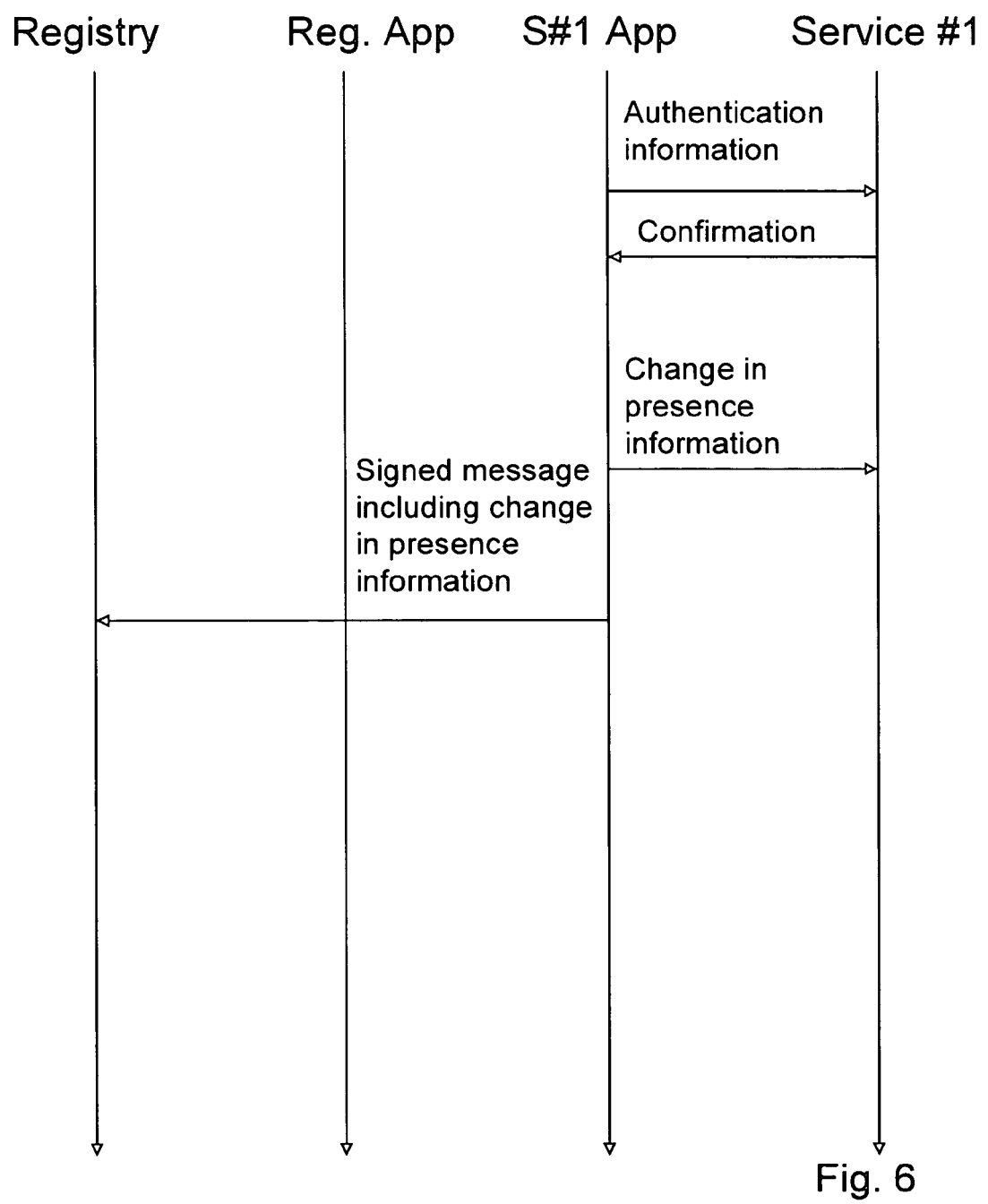
FIG. 6 is a message flow diagram showing a second process for authentication and presence information updating.

Alternatively, in the case of having used the authentication method of FIG. 3, as shown in FIG. 6, the service provider application can be configured to send the change in presence information to both its corresponding service provider and the registry. When the change in presence information is sent to the registry, it is preferably signed using the same private key that was used during the process of adding an identity shown in FIG. 3. In such a configuration, the registry can verify the authenticity of signed message containing change in presence information using the public key corresponding to the identity. This enables the registry to receive presence information updates without requiring the registry to log into the service provider as a proxy. Moreover, if the registry has cached a copy of the public key received during the identity adding process, the registry does not have to re-contact the service provider to verify the authenticity of the change. This can reduce load on the service provider's network.

Figure 7:
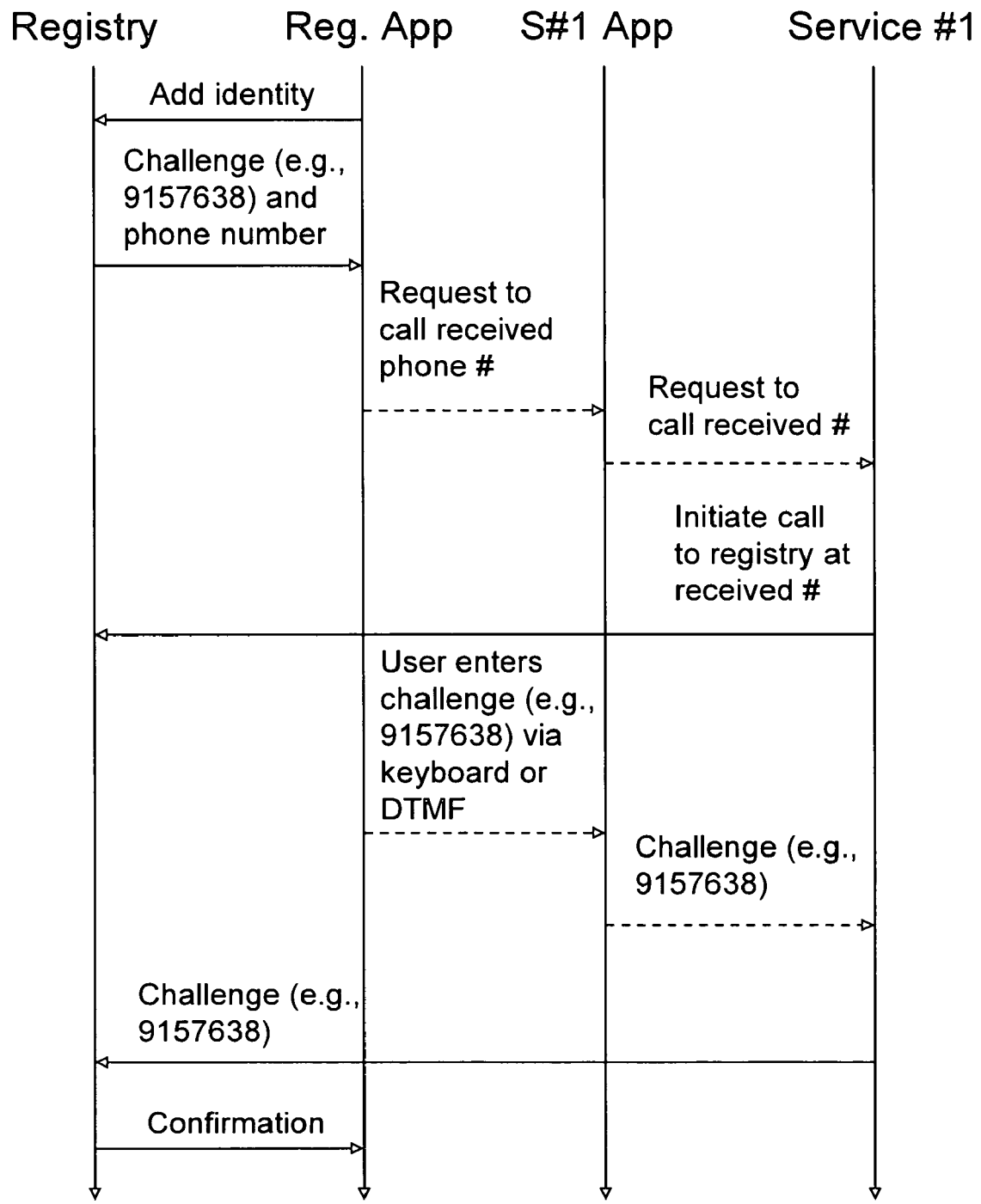
FIG. 7 is a message flow diagram showing a first identity authorizing process for use with the network of FIG. 1.
Figure 8:
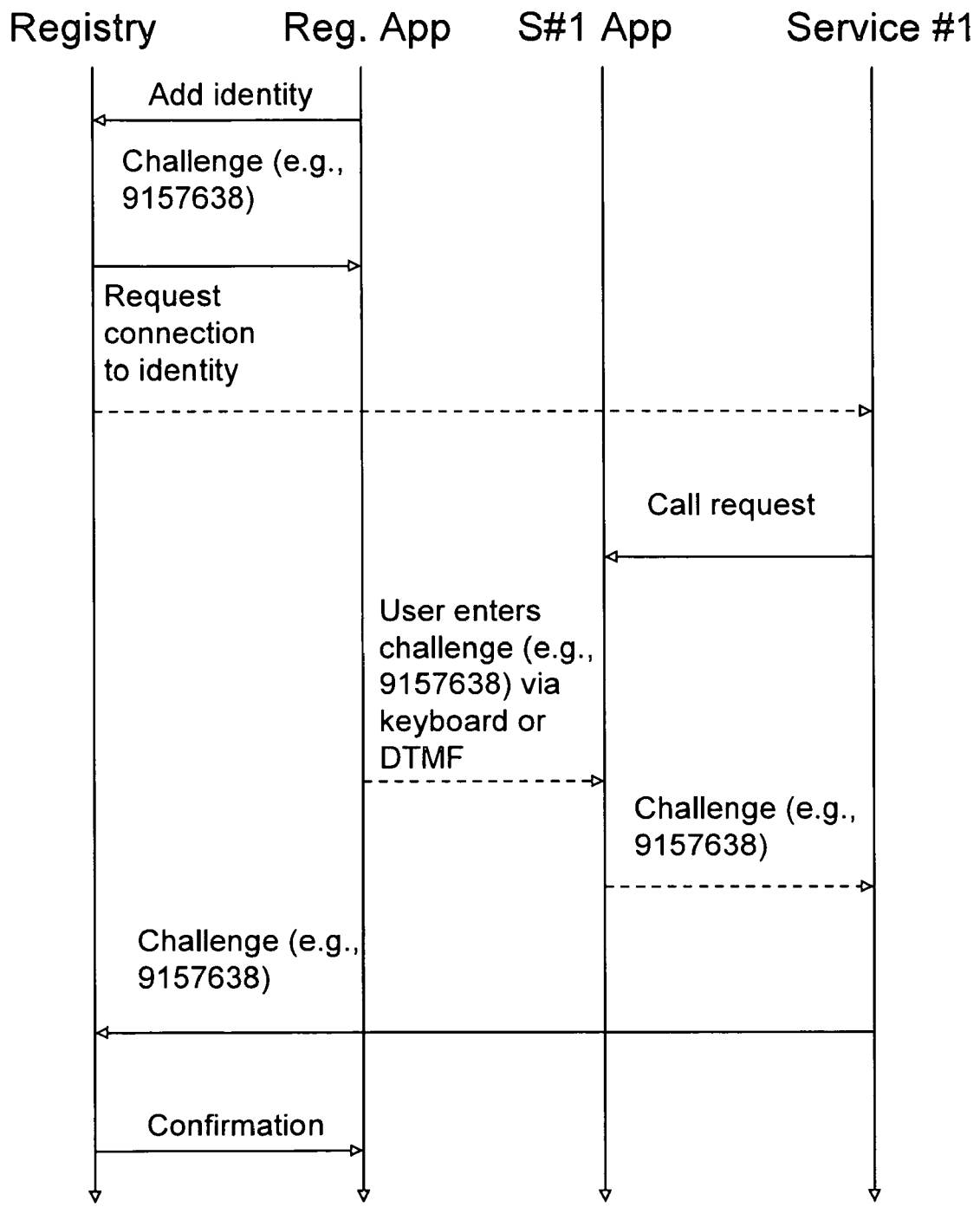
FIG. 8 is a message flow diagram showing a first identity authorizing process for use with the network of FIG. 1.

As shown in FIGS. 7 and 8, various other authentication protocols are also possible. In FIG. 7, assuming that the registry application has already sent an "Add identity" message including an identifier to the registry, the registry sends back a random challenge to the registry as was discussed above with reference to FIG. 2. However, as shown in FIG. 7, contemporaneously with receiving the challenge, the registry application also receives a phone number (or the name of an identity) indicating where it should be contacted. The user provides this phone number (or identity) to the service provider application which forwards it to the service provider for initiation of a telephone call. The service provider then connects to the telephone number (or identity). In at least one such embodiment, the telephone number (or identity) being used by the registry is provided by the service provider such that the authentication phone call remains "on network" for the service provider. Upon establishing a phone connection between the service provider and the registry, the user is prompted to enter the challenge (e.g., using a keyboard or DTMF tones, depending on the capabilities of the service provider application). Because the registry is able to determine on whose behalf the incoming call is being made (e.g., by looking at the caller ID information for a SKYPE telephone to SKYPE telephone call), the registry can then confirm that the challenge has been properly delivered to the user corresponding to the identity which is being added.

Alternatively, as shown in FIG. 8, similar to the authentication process shown in FIG. 7, a telephone connection can be made between the service provider and the registry so that the user may send the challenge to the registry over a telephone connection. However, in FIG. 8, it is the registry that establishes a connection to the service provider associated with the identity being added and requests that a connection be made to that identity. In this way the requirement for authentication of the identity on the service provider is pushed to the original service provider itself.

While the above embodiments of FIGS. 7 and 8 have been described with respect to establishing a telephone connection (e.g., a SKYPE telephone) between the registry and the service provider, other types of connections are also possible. For example, a text messaging connection between authenticated text messaging clients (e.g., between MICROSOFT MESSENGER messaging service clients) can also be established and the challenge(s) sent across those connections.

In configurations such as those discussed above with respect to FIGS. 7 and 8, the registry may include an automated response program (e.g., an avatar) that handles the incoming and/or outgoing connections and the parsing of the received challenges and/or the prompting for the challenges, whether the connections be telephone-based, text-based or a combination thereof.

A system, such as the registry described above, that tracks identities and corresponding presence information can provide additional that also make use of information stored in the registry. For example, the registry can support in-bound (i.e., pull to the user) and out-bound (i.e., push to the user) directed advertising to a particular user, whether or not the user manages plural identities through the registry. The advertising sent may be informed by the user's behavior on one or across multiple service provider domains.

Using a system such as the registry system described above, a user may also be able to manage a set of preferences that controls the order in which the user will be contacted when an in-bound request for communications arrives at the registry. For example, when Bob wants to initiate a text/voice messaging session with Sally, Bob's registry-compatible text messaging client may see that Sally is on-line and available for text messaging, but it may not show whether Sally is using AOL IM messaging service, GOOGLE TALK messaging service, or NET2PHONE COMMCENTER messaging service (because Sally doesn't want it known or because Bob's contact management software only displays presence information about modes, not applications). Bob might therefore invite Sally to a text and/or voice messaging chat session without knowing to which application the "invite" message is sent. That decision could be made by the registry in accordance with logic rules Sally establishes. For example, Sally might have established a connection preference rule (e.g., a "find me" rule) for the PICUP persona Bob is calling that "rings" her first using the NET2PHONE COMMCENTER messaging service, then using the GOOGLE TALK messaging service, then using the AOL INSTANT MESSENGER messaging service. Alternatively, the preference may be based on dynamic conditions, such as which application was most recently used, what time of day it is, what day it is, whether it is a holiday, etc. Other logic rules are possible, and all could be maintained as part of the registry user record for Sally.

Such preferences also make it possible to receive a preferred mode of communication. For example, the list of preferences may state that during the weekday, the preferred method of connecting is via a specified work telephone number, and then at a cell phone, and then at a voice-based messaging service, then at a text-based messaging service, etc. Alternatively, the list of preferences may state that during the weekend, the preferred method of connecting is via a voice-based messaging service, then at a text-based messaging service, and then no other connections are permitted. Thus, an initiating user may use the registry application to ask the registry what the best match is for contacting a receiving user, and then, based on the information returned, the registry application can start (or request that the user start) the appropriate service provider application to establish the communication channel between the initiating and receiving users.

The registry application may also be configured such that it interfaces with at least one of the service provider applications to provide connection control (e.g., call set up and tear down) and messaging services. In such a configuration, the user interfaces with the registry application to send messages (e.g., text message, voice messages or voice-over-IP call streams) to the service provider application which then sends them on to its corresponding service provider. The registry application may perform media protocol translations as necessary to provide the messages to the service provider application in a format which it understands. For example, if the registry application receives a voice stream in a first format (e.g., raw) but the service provider application expects it in a second format (e.g., compressed), then the registry application may perform the necessary conversion. In one embodiment, the registry application and the service provider application engage in a format negotiation to determine a preferred format for sending the messages.

Alternatively, the registry can act as simply an information repository that can be queried by a service provider such that the service provider can provide PICUP-aware routing services to its clients. For example, a PICUP-aware instant messaging server can be used to interact with standard instant messaging clients (e.g., XMPP clients such as iChat and Pidgin). (The Extensible Messaging and Presence Protocol (XMPP) is described in RFC 3920 and RFC 3921, the contents of which are incorporated herein by reference.) Users log into the PICUP server using any of their personalities and any of their XMPP clients. Then, the PICUP-aware server can send to the client a list of all buddies that are logged on, without revealing which IM-clients they are using and with which personality. Later, when a client requests to connect to a buddy, the PICUP-aware server can connect to the buddy without having to divulge which IM-client the buddy is using and with which personality.

Similarly, a VoIP server (such as an Asterisk server) can be made to be PICUP-aware to route calls according to a user's preferences. (For additional details on Asterisk, see Asterisk: The Future of Telephony, by Jim Van Meggelen, Jared Smith, Leif Madsen, Second Edition August 2007, published by O'Reilly Publishing, the contents of which are incorporated herein by reference.) When an incoming call is received at a PICUP-aware VoIP server for a number that is associated with a PICUP user, the PICUP-aware VoIP server can access PICUP to determine if the user has established any preferences which affect how the call is to be routed. For example, "Mary" may have has established a rule that incoming calls to her extension "x1234" should be routed to her cell phone if the caller ID information indicates that the call is from her home or from the cell phone of a family member. Likewise, she may establish a rule to call her in an office down the hall if she knows that she is out of the office. Alternatively, Mary may establish a rule that indicates that inbound calls from VoIP clients should be routed based on who is calling her and at what time. Because her friends and associates may change which VoIP client they use, by establishing rules based on PICUP names and personalities rather than company specific personalities, Mary may be better able to handle who can and cannot reach her and when.

A similar routing preference interface can be established for other communications paradigms. For example, an e-mail server (e.g., an SMTP server) can be made PICUP-aware such that it can control how e-mail is processed and forwarded. For example, when an email is received at a server, the e-mail server can consult the PICUP server for routing rules that might affect how the mail is delivered. As one example, e-mail from a particular user (e.g., a boss) might always be accepted and sent to an email address associated with where the user is logged on (e.g., either home or office) so that the e-mail is seen as quickly as possible. Alternatively, e-mail from known unwanted addresses may be sent directly to the trash or a folder associated with junk email. Again, by using PICUP-aware routing, a boss who is on vacation and can only use his g-mail account may still be able to reach an employee with high priority if the employee's rules are based on the boss' PICUP-identity rather than just a particular e-mail address.

The same kind of rules can be applied to calendar events that are sent. A PICUP-aware calendar server can access the rules that a user has established to determine if and how calendar requests should be automatically processed based on who is requesting a meeting and when the requested meeting is.

Any number of grammars can be used for defining rules and actions. An exemplary rule grammar is defined as follows:

[Source]:[Target]:[Source Op]:[Target Op]:[Rule Expression]:[ACL].

[Source] identifies who is initiating the rule and is polymorphic such that [Source] may refer to a subscriber, a group of subscribers or anonymous sources.

[Target] is polymorphic and may be used to identify subscribers, modes of contact (telephone or IM) or attributes about a subscriber.

[Source Op] defines an operation to be performed and includes "Search", "Call" and "Add".

[Target Op] defines how contacts are redirected or may be null.

[Rule Expression] defines a temporal expression that causes the expression to be performed at certain times (or conditions)

[ACL] is an access control list that defines whether the rule is Searchable, Retrievable and/or requires an Invitation to be able to search and/or retrieve.

Using the above grammar, example rules can be created as follows:

(1) [Subscriber1]:[Subscriber2]:[Call]:[redirect to cell]:[if after work hours]:[Retrievable] in order to reroute a call from a specified caller to subscriber2's cell phone (2) [Anonymous]:[Subscriber2]:[Call]:[redirect to voicemail]:[weekend]:[Retrievable] in order to reroute calls from unknown callers to subscriber2's voicemail (3) [Subscriber2]:[Attribute:cell #]:[Add]:[null]:[weekdays]:[Requires Invitation]

Similarly, requests to determine information about a subscriber can be written as rules such as:

[Subscriber2]:[Cellphone]:[Search]:[null]:[null]:[null] in order to attempt to receive the cell phone number of subscriber2.

By using access control lists, a subscriber can control whether information can be searched or retrieved. This may be appropriate where you want to avoid the PICUP-server divulging as part of a search certain information (e.g., that your age falls into a particular range), but you are willing to allow other information to be retrieved if the person making the query already knew that information. For example, you can retrieve a person's cell phone number if you already know their age, but the system will not let you search for a person's age. Thus "age" would be retrievable but not searchable.

Because of the flexibility of the attributes that can be associated with a user's PICUP identity, those attributes can be used as persistent storage of information between different authenticated PICUP users. For example, "Joe" may add information associated with an attribute to his PICUP account and allow "Mary" to search and/or retrieve the information by querying that attribute. In this way, information, such as sales figures, can be stored by Joe such that Mary can pick them up later. One form of information associated with an attribute may be a file such that all the proper formatting and data may be associated with the attribute other than just storing text. Similarly, voice clips and any other information can be associated with an attribute. In this way, a subscriber's voicemails from various phones could be stored in a central location and retrieved by any application that the subscriber uses to authenticate himself/herself.

As described above, a number of existing applications can be modified to become PICUP aware. These applications can be modified to use either web-based APIs or actual code (e.g., c or C++ libraries) that can be linked in with the application. Either way, the service receives PICUP authentication information from a subscriber to authenticate the subscriber to PICUP and allow the server to retrieve information on the user's behalf. Alternatively, client applications may be developed that use the same Web or code interfaces to interact with PICUP directly. For example, an application that retrieves information associated with stored attributes in the PICUP server does not to interact with any server other than the PICUP server. Thus, such an application could authenticate the user to the PICUP server and retrieve the information (e.g., voicemails) directly.

As discussed above, attributes may be set to be searchable by subscribers. As such, a number of services may be built that perform certain searches in order to determine which subscribers match particular criteria. For example, a phone company may wish to run a promotion that seeks to target male consumers 21-25 for a chance to go to a football playoff game. If subscriber's have made their age and sex attributes searchable, an authenticated PICUP-aware phone service server may query the PICUP server for subscribers that meet that criteria. Such a query may be run at the phone service server, at the PICUP server or on a combination of both. These searches may be implemented as "plug-ins" to the various servers, assuming that the plug-ins have been authenticated and tested.

As described above, PICUP allows users to address contacts that have multiple network identities (email addresses, IM names, gaming IDs, phone numbers, social network IDs, etc.) with a single name regardless of which application they happen to be running. One way to do that would be to replace all of the existing names with a new identity in a single "super" name space. However, unique names in a single name space are scarce, and late arriving users are forced to choose odd or cumbersome identities that their friends and colleagues may not intuitively associate with them.

Alternatively, users can instead use any of the existing names registered with PICUP as a means of finding a PICUP user, and, once found, tell PICUP that that found name is currently associated with the intended user. This can be illustrated with the following example. PICUP subscriber, Sally Parker, has the names sally.parker@gmail.com, sp439@aol.com, and sallyp@skype.com, associated with her email, AOL IM, and Skype VoIP services, respectively. Sally would register these with PICUP, which would store them in its database within a record associated with Sally. A caller could then use any of these names to lookup Sally's record. For instance, another PICUP subscriber, Bill Smith, could send a request to PICUP asking for information about Sally. Bill could transmit the name sally.parker@gmail.com to PICUP. Sally's record in the database would be retrieved, and PICUP could inform Bill of the various ways that Sally could be reached (subject to Sally's privacy rules). Bill could also add Sally to his record as a contact.

A problem with this approach is that there is no assurance that Sally will keep each of her existing application identities. Say, for example, that Sally became unhappy with her gmail service, decided to switch to hotmail, and so deletes sally.parker@gmail.com from her record, and adds sp111@hotmail.com to her record. Now the next time Bill tries to communicate with Sally, he uses sally.parker@gmail.com but cannot retrieve Sally's record, and the attempt fails. Worse, another subscriber in the meantime may have selected the name sally.parker@gmail.com, and now Bill will be put in touch with the wrong subscriber. Sally could elect to give Bill her unique PICUP login name, but that suffers from all the drawbacks of the super namespace. Also, Sally might not want to share her login name with Bill for any of several reasons (security, privacy, etc.).

Accordingly, there is a need for a naming system that allows one user to refer to any other user by a name that is: (i)

memorable, (ii) distinctive, (iii) persistent, and (iv) decentralized. See Zooko's Triangle, http://en.wikipedia.org/wiki/Zooko%27s_triangle; The Persistence of Identity, http://www.wyman.us/main/2006/12/the_persistence.html.

An implementation of a PICUP server may address this problem by allowing Bill to establish his own name for Sally as an alias or nickname, and to store that nickname in Bill's record. Specifically, this works as follows. Every PICUP record is given an identifier (e.g., a large number or character string) that is unique and distinct from all other PICUP record identifiers, and is never re-used even if the record is deleted. This identifier is internal to PICUP—it need never be exposed to subscribers, let alone to their contacts. When Bill first adds Sally as a contact in his record, perhaps after searching the PICUP database using one of her existing identities, Bill provides a nickname for her contact entry that he would like to use to refer to Sally. This nickname is stored in Bill's record, and PICUP internally links the nickname to Sally's record ID (without exposing Sally's record ID to Bill). The nickname Bill chooses need not be unique to the entire PICUP database; it only needs to be unique among the nicknames used by Bill. Now, whenever Bill wants to identify Sally's record in order to obtain information, all he has to do is identify himself (directly using his password or through a "triangle of trust" relationship) and his nickname for Sally. PICUP then find's Bill's record, and uses the nickname to obtain the unique ID for Sally's record. Using this approach, Sally may change any and all of her service names without ever having to tell any of her contacts. She also doesn't have to expose to Bill her login name or any other information in her user record that she doesn't want him to have.

In addition, "petnames" can be used to associate internal identifiers with subscribers. For a discussion on petnames, see Petname Systems by Marc Steigler, HPL-2005-148, the contents of which are incorporated herein by reference.

While certain configurations of structures have been illustrated for the purposes of presenting the basic structures of the present invention, one of ordinary skill in the art will appreciate that other variations are possible which would still fall within the scope of the appended claims.

The invention claimed is:

1. A computer-implemented method of providing a global name space to subscribers of a computer-readable registry stored in a computer memory, comprising:
   associating, in a first user record associated with a first subscriber, (1) a first service provider identity of the first subscriber and (2) a first unique identifier internal to the registry, including the steps of:
      receiving at a microprocessor of the registry the first service provider identity to associate with the first user record on behalf of the first subscriber;
      causing the registry to send a challenge to an application of the first subscriber;
      receiving by the registry, from a service provider that previously authenticated the first service provider identity, information indicating that a correct response to the challenge was received, wherein the receiving information indicating that the correct response to the challenge was received comprises receiving the challenge from the service provider that previously authenticated the first service provider identity; and
      associating the first service provider identity to the first user record on behalf of the first subscriber after receiving the information indicating that the correct response to the challenge was received;
   querying the registry to determine if the first service provider identity is stored within the registry;
   associating, in a second user record associated with a second subscriber, (1) a nickname for the first subscriber and (2) the first unique identifier internal to the registry without exposing the first unique identifier to the second subscriber.

2. The method as claimed in claim 1, querying the registry on behalf of the second subscriber for at least one service provider identity of the first subscriber using the nickname stored in the second user record.

3. The method as claimed in claim 1, wherein the receiving information indicating that the correct response to the challenge was received comprises receiving the challenge from the service provider that previously authenticated the first service provider identity using DTMF tones via a telephone connection.

4. The method as claimed in claim 1, wherein the receiving information indicating that the correct response to the challenge was received comprises receiving the challenge from the service provider that previously authenticated the first service provider identity using DTMF tones via a telephone connection to the registry from the service provider that previously authenticated the first service provider identity.

5. The method as claimed in claim 4, further comprising sending a telephone number to use in the telephone connection from the registry to the application of the first subscriber.

6. A computer-implemented method of providing a global name space to subscribers of a computer-readable registry stored in a computer memory, comprising:
   associating, in a first user record associated with a first subscriber, (1) a first service provider identity of the first subscriber and (2) a first unique identifier internal to the registry, including the steps of:
      receiving at a microprocessor of the registry the first service provider identity to associate with the first user record on behalf of the first subscriber;
      causing the registry to send a challenge to an application of the first subscriber;
      receiving by the registry, from a service provider that previously authenticated the first service provider identity, information indicating that a correct response to the challenge was received, wherein the receiving information indicating that the correct response to the challenge was received comprises receiving a public key from the service provider that previously authenticated the first service provider identity and using the public key to check a signature of a signed message received from the application of the first subscriber; and
      associating the first service provider identity to the first user record on behalf of the first subscriber after receiving the information indicating that the correct response to the challenge was received;
   querying the registry to determine if the first service provider identity is stored within the registry;
   associating, in a second user record associated with a second subscriber, (1) a nickname for the first subscriber and (2) the first unique identifier internal to the registry without exposing the first unique identifier to the second subscriber.

* * * * *